July 7, 1931. H. KATTWINKEL 1,813,576
MANUFACTURE OF FRICTION BODIES FOR BRAKE AND CLUTCH PURPOSES
Filed April 16, 1929 2 Sheets-Sheet 1
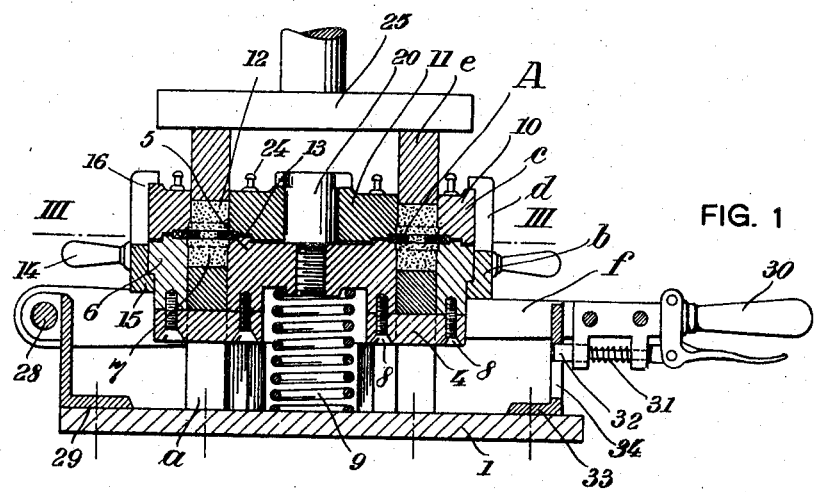
FIG. 1
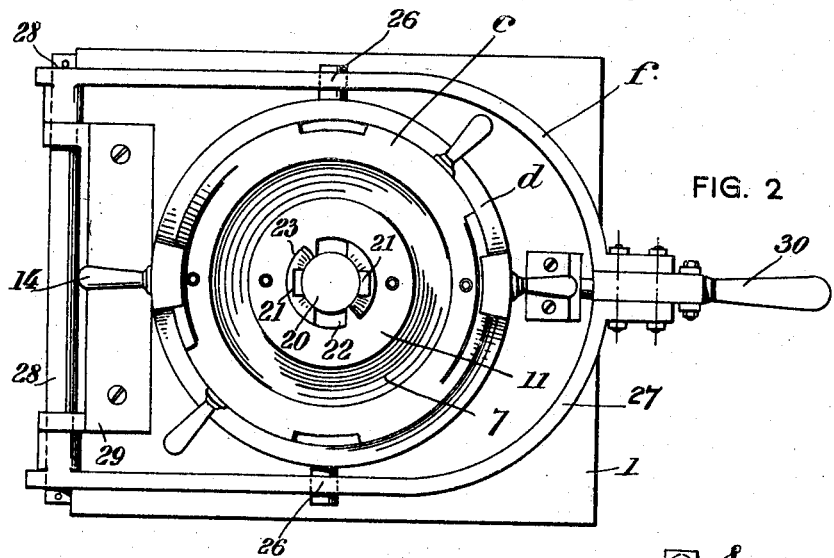
FIG. 2
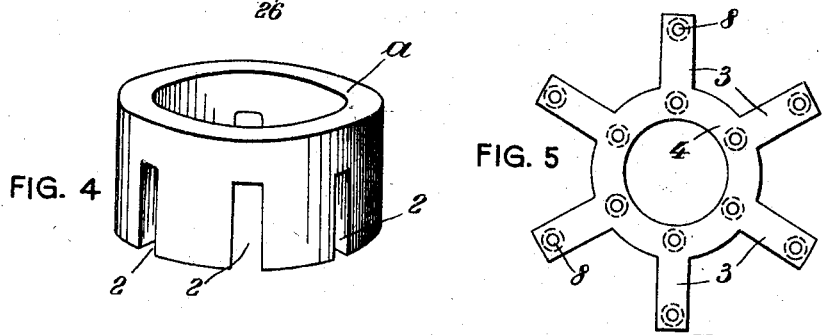
FIG. 4
FIG. 5
Inventor;
Hans Kattwinkel,
By his Atty, July 7, 1931. H. KATTWINKEL 1,813,576
MANUFACTURE OF FRICTION BODIES FOR BRAKE AND CLUTCH PURPOSES
Filed April 16, 1929  2 Sheets-Sheet 2
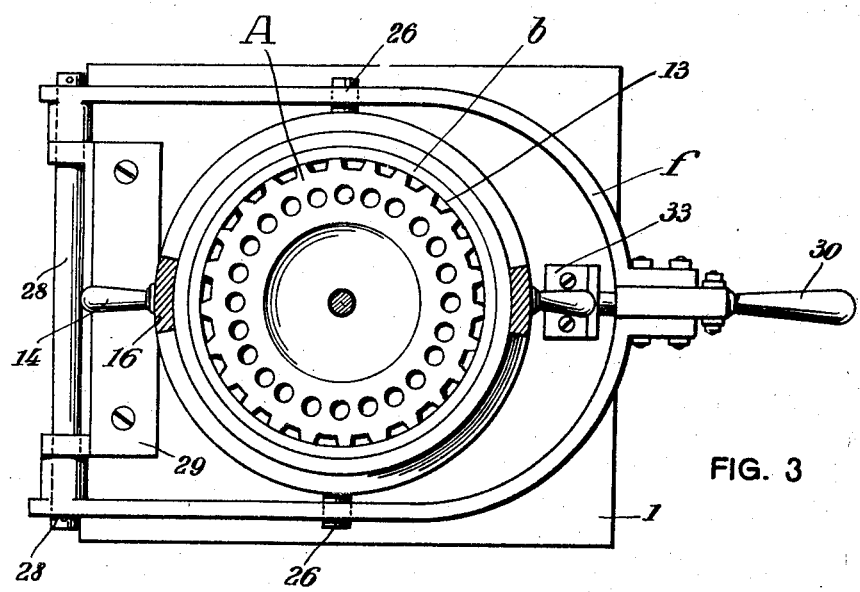
FIG. 3
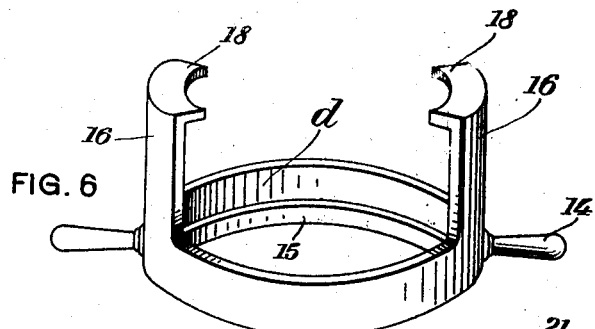
FIG. 6
FIG. 8
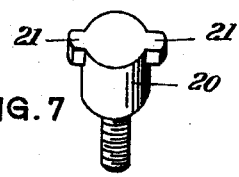
FIG. 7
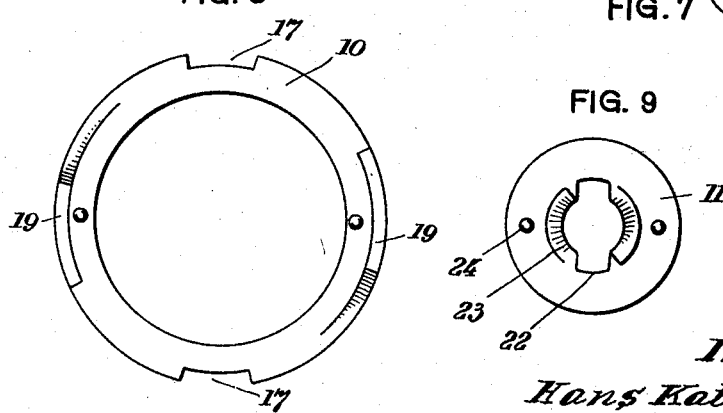
FIG. 9
Inventor;
Hans Kattwinkel,
By his Atty, Patented July 7, 1931

1,813,576

UNITED STATES PATENT OFFICE

HANS KATTWINKEL, OF COSWIG, GERMANY

MANUFACTURE OF FRICTION BODIES FOR BRAKE AND CLUTCH PURPOSES

Application filed April 16, 1929, Serial No. 355,594, and in Germany April 24, 1928.

My invention relates to the manufacture of friction bodies for brake and clutch purposes, and more particularly to the manufacture of friction rings for laminated disc clutches.

In recent brakes and friction clutches, friction bodies are employed which consist of sheet-steel rings covered on both sides with a special frictional material. This frictional material consists as a rule of a fibrous substance, such as asbestos, saturated with an artificial resin, and is united with the sheet-steel ring by being forced into holes in the ring from both sides while in a plastic condition, and then hardened. The main object of my present invention is to provide a method for applying such frictional material to the sheet-steel ring in an efficient and economical manner, and to provide a device adapted to effectively carry out said method.

One preferred constructional form of such a device is illustrated by way of example in the accompanying drawings, in which Figure 1 is a sectional elevation of the device, Figure 2 is a plan, and Figure 3 a horizontal section on the line III—III in Fig. 1, while Figures 4 to 9 illustrate details.

The drawings are based on a constructional form of my invention which serves for the manufacture of two-sided frictional coverings for ring discs of the kind shown at A in Figure 3. The disc A, consisting of sheet steel, is provided with a rather large number of holes, into which the frictional material is forced by pressure from both sides. The outer margin of the annular disc is constructed in a known manner, for instance as a ring of teeth, or otherwise provided with tappets, or like driving elements. Of the device only the press mould that receives the ring to be coated, together with the cavities that receive the frictional material, and the press rams, along with the mechanism directly associated therewith, are shown in the drawings. The press itself, which may be an ordinary hydraulic or eccentric press, is omitted, since it is of no importance for the elucidation of the invention.

The device comprises six main parts, namely, an under ram $a$, which is rigidly connected with a base plate 1 resting upon the table of the press, a lower swage member $b$, an upper swage member $c$, a member $d$ that locks the two swage members together to form virtually a single body hereinafter designated a press mould, an upper ram $e$, and a mechanism $f$ for guiding the press mould.

The entire device is carried by the base plate, which, as mentioned, is rigidly connected with the under ram $a$. The under ram consists of a hollow cylinder of hardened steel, which, as shown more particularly in Figure 4, is provided with a number of slots 2 (in the present case six), which serve for the reception of the arms 3 of a star-shaped ring 4, shown in Figure 5, which is pushed from below, into the ram ring $a$, and serves to unite the two annular portions 5 and 6 of the lower swage member $b$ to one another. The parts 5 and 6 form concentric annular bodies, which leave between them an annular cavity 7. The star ring 4 is connected with the swage parts 5 and 6 by means of screws 8. The lower swage $b$ rests upon a strong helical spring 9, which bears at one end upon the base plate 1, and at the other end upon the hub portion of the swage part 5, which is normally held by the spring in its upper limiting position, in which the arms 3 bear upon the upper ends of the slots 2 in the ram ring $a$.

The upper swage $c$ likewise consists of two rings, an outer ring 10 and an inner ring 11. The annular gap 12 between these two rings corresponds in its dimensions to the annular gap 7 in the lower swage. The upper and lower swages are provided, on the sides that face one another, with turned recesses 13 radially connected with the annular spaces 7 and 12, and into these recesses the sheet metal ring A fits. The latter is held in its position by tightening up the parts 10 and 11 of the upper swage. The outer ring 10 is tightened up by means of the locking member $d$, which is provided with handles 14, and which engages with its inwardly projecting lower edge 15 under a corresponding flange on the lower swage part 6, and embraces the ring 10 of the upper swage with two bridge-like bars 16 bent over like hooks. This ring is provided on the periphery with recesses 17, and on the upper side with wedge-shaped surfaces 19, as shown in Figure 8. The recesses 17 enable the ring 10 to be fitted on, the claws 18 of the bridge-pieces 16 passing through the notches. The locking of the ring 10 to the under swage is effected by rotating the body $d$, the claws 18 of which then run up the wedge surfaces 19. The inner ring 11 is guided on a bolt 20 screwed into the hub portion of the lower swage. This bolt has two opposite lugs 21, as shown in Figure 7, to which there correspond two notches 22 in the ring 11.

Upon the upper side the ring 11 is provided with wedge-like surfaces 23, which pass into engagement with the lugs 21 when the ring 11 undergoes a corresponding rotation. This rotation is effected by fitting a spanner-like implement on to knobs 24 provided on the upper side of the ring 11. The upper ram $e$, consists like the lower ram, of a hardened hollow cylinder of steel. Upon the upper edge of this cylinder is mounted the head 25 of the press.

The ring 6 of the lower swage is provided on two opposite points with pins 26 (Fig. 2), which engage in holes in a bow-shaped lever 27, the limbs of which are rotatably supported at 28 on an angle-piece 29 connected with the bottom plate 1. On the other end of the bow 27 is provided a handle 30 with a locking device. The locking device consists of a spring-actuated locking bar 32, which engages with the upper edge of a notch 34 provided on an angle-piece 33.

The method of working of the apparatus is as follows:

After the lower swage located in the raised position according to Figure 1, has been set free by removing the upper swage and the upper ram, the annular cavity 7 is first of all filled with the plastic frictional material, which may consist for example of a dried mixture of asbestos fibres with an alcoholic solution of an artificial resin. After the annular cavity has been completely filled with the material, the sheet steel ring A is fitted into the turned recess 13 in the lower swage. The inner ring 11 of the upper swage is now first pushed over the bolt 20 and locked to the under swage by rotating, the inner edge of the sheet-metal ring A being firmly clamped. The outer ring 10 is then fitted on, and tightened by rotating the locking body $d$, whereby the outer edge of the sheet-metal ring A is firmly clamped. After this the volume of the lower swage cavity is somewhat decreased and the frictional material filled into the said cavity is correspondingly subjected to a slight previous pressure to ensure a complete filling of the said swage cavity, so that during the pressing operation no frictional material may penetrate from the upper swage-cavity through the perforations in the laminated disc into the lower swage-cavity. For the said purpose the swage-parts are adjustable relatively to the lower pressure-member before the beginning of the pressing operations which adjustment is executed by means of the hand-lever 27. Frictional material is now likewise placed in the annular space 12 between the parts 10 and 11, up to a level which may by indicated by a mark, and which corresponds to the height of the lower filling. The upper ram $e$ is then put into the annular space, whereupon the press may be started. The upper ram $e$ then penetrates into the annular space 12 and compresses the material located therein. As the pressure increases, the press mould yields as a whole in a downward direction against the resistance of the spring 9, so that a compression of the material in the lower annular space 7 also takes place. During the downward motion of the swage the hand-lever 27 is taken along by said swage, as the lever is yieldingly suspended. The frictional material both above and below the sheet-metal ring A is uniformly compressed without the sheet-metal ring itself being subjected to any compressive stresses in either direction.

This is particularly important, amongst other reasons, because the pressure to be applied is very considerable, so that with any one-sided stressing a distortion of the sheet-metal ring towards the other side would be inevitable. The compression of the frictional material is very considerable; its final volume after the pressing amounts to only about one-eighth or one-tenth of its original volume. By this pressing the frictional covering acquires the ultimate thickness desired. As the pressure head goes back, the upper ram $e$ is taken with it. The press mould is pushed up again by the spring 9. The locks of the upper swage members are now released and the upper swage members removed. Removal is facilitated by the knobs also provided on the outer ring 10. The sheet-metal ring A now provided on both sides with the frictional material, is taken out by lowering the under swage by means of the lever mechanism 27.30.

I claim:

1. Method of securing a frictional covering to laminations of friction clutches and the like, which consists in applying a mass of fibres impregnated with a binding substance in preliminarily dried loose condition and in substantially equal portions on either side of an annular disc of sheet-metal provided with a plurality of apertures, confining one of said portions laterally all over the inner and outer periphery of said disc, and the other portion laterally as well as downwardly, causing a pressure-member to act in a direction transversely to the plane of said annular disc only on said laterally confined portion of said mass, and causing said annular disc to move at substantially half the speed of motion of said pressure member and in the direction of motion of the latter.

2. In an apparatus for applying frictional material to perforated annular discs of sheet-metal, a swage comprising two parts adapted to securely grip between them an annular disc of sheet-metal provided with denture-like recesses, an annular pressure space provided oppositely to said disc in each of said swage-parts, an annular pressure member within each of said pressure spaces, and means for moving said pressure-members relatively to each other and to said swage-parts so as to exert substantially the same pressures on both sides of said disc, when put intermediate said swage-parts.

3. In an apparatus for applying frictional material to perforated annular discs of sheet-metal, a swage comprising two parts adapted to securely grip between them an annular disc of sheet-metal provided with denture-like recesses, an annular pressure space provided oppositely to said disc in each of said swage-parts, an annular pressure-member within each of said pressure spaces, one of said pressure-members being stationary and the other movable relatively to said stationary member and to said swage, means for moving said movable member, and means permitting said swage to move equally relatively to both said stationary and said movable pressure-member.

4. In an apparatus of the character described a swage comprising two parts adapted to securely grip an annular disc of sheet-metal, annular molding cavities provided oppositely to said disc, one in each of said swage-parts, an annular pressure-member provided within each of said molding cavities, one of said pressure-members being stationary and the other movable relatively to said stationary member and to said swage, means for moving said movable member, and means permitting to move said swage in the direction of motion of said movable member by an amount equal to one half of the stroke of said movable member.

5. In an apparatus of the character described a swage comprising two parts adapted to securely grip an annular disc of sheet-metal, means for clamping said two swage-parts together, an annular molding cavity within each of said swage-parts, a stationary annular pressing member within one of said molding cavities, said swage being mounted to permit sliding on said stationary member, an annular ram within the other of said molding cavities, means for imparting to said ram an operative motion relatively to said stationary member, and means adapted to move said swage in the direction of motion of said ram by an amount equal to one half of the stroke of said ram.

6. In an apparatus of the character described a swage comprising two parts adapted to securely grip an annular disc of sheet-metal, means for clamping said two swage-parts together, an annular molding cavity within each of said swage-parts, a stationary annular pressing member within the one molding cavity, said swage being mounted to permit sliding on said stationary member, an annular ram within the other molding cavity, means for imparting to said ram an operative motion relatively to said stationary member and resilient supporting means for the swage.

7. In an apparatus of the character described an upper swage member comprising two concentric ring bodies forming an annular molding cavity between them, a lower swage member comprising two concentric ring bodies forming an annular molding cavity between them, a movable upper pressing member in the form of a hollow cylinder, a stationary lower pressing member in the form of a hollow cylinder, connecting means for rigidly connecting the bottom ends of the ring bodies of said lower swage member to each other, axially extending recesses adapted to receive said connecting means, means for imparting to said upper pressing member an operative motion relatively to said lower pressing member, and means permitting said swage members to move in the direction of motion of said upper pressing-member by an amount substantially equal to one half of the motion of said upper pressing member.

8. In an apparatus of the character described, an upper swage member comprising an inner and an outer ring body forming an annular molding cavity between them, a lower swage member comprising an inner and an outer ring body forming an annular molding cavity between them, means for locking together said inner ring bodies and said outer ring bodies, a movable upper pressing member in the form of a hollow cylinder, a stationary lower pressing member in the form of a hollow cylinder, connecting means for rigidly connecting the bottom ends of the ring bodies of said lower swage member to each other, axially extending recesses adapted to receive said connecting means, means for imparting to said upper pressing member an operative motion relatively to said lower pressing member, and means permitting said swage members to move in the direction of motion of said upper pressing-member by an amount substantially equal to one half of the motion of said upper pressing member.

9. In an apparatus of the character described, an upper swage member comprising two concentric ring bodies forming an annular molding cavity between them, a lower swage member comprising two concentric ring bodies forming an annular molding cavity between them, a movable upper pressing member in the form of a hollow cylinder, a stationary lower pressing member in the form of a hollow cylinder, connecting means for rigidly connecting the bottom ends of the ring bodies of said lower swage member to each other, axially extending recesses adapted to receive said connecting means, means for imparting to said upper pressing member an operative motion relatively to said lower pressing member, and resilient supporting means for said lower swage member.

10. In an apparatus of the character described an upper swage member comprising an inner and an outer ring body forming an annular molding cavity between them, a lower swage member comprising an inner and an outer ring body forming an annular molding cavity between them, annular recesses in adjacent edges of said ring bodies so as to form shoulders adapted to grip an annular disc of sheet-metal, means for locking together said inner ring bodies and said outer ring bodies, a movable upper pressing member in the form of a hollow cylinder, a stationary lower pressing member in the form of a hollow cylinder, connecting means for rigidly connecting the bottom ends of the ring bodies of said lower swage member to each other, axially extending recesses adapted to receive said connecting means, means for imparting to said upper pressing member an operative motion relatively to said lower pressing member, and resilient supporting means for said lower swage member.

11. In an apparatus of the character described an upper swage member comprising an inner and an outer ring body forming an annular molding cavity between them, a lower swage member comprising an inner and an outer ring body forming an annular molding cavity between them, annular recesses in adjacent edges of said ring bodies so as to form shoulders adapted to grip an annular disc of sheet-metal, means for locking together said inner ring bodies and said outer ring bodies, a movable upper pressing member in the form of a hollow cylinder, a stationary lower pressing member in the form of a hollow cylinder, connecting means for rigidly connecting the bottom ends of the ring bodies of said lower swage member to each other, axially extending recesses adapted to receive said connecting means, means for imparting to said upper pressing member an operative motion relatively to said lower pressing member, resilient supporting means for said lower swage member, and lever means allowing to arbitrarily lower said swage member against the action of said resilient means.

12. In an apparatus of the character described, an upper swage member comprising an inner and an outer ring body forming an annular molding cavity between them, a lower swage member comprising an inner and an outer ring body forming an annular molding cavity between them, means for locking together said inner ring bodies and said outer ring bodies, a movable upper pressing member in the form of a hollow cylinder, a stationary lower pressing member in the form of a hollow cylinder, connecting means for rigidly connecting the bottom ends of the ring bodies of said lower swage member to each other, axially extending recesses adapted to receive said connecting means, means for imparting to said upper pressing member an operative motion relatively to said lower pressing member, and resilient supporting means for said lower swage member.

13. In an apparatus of the character described, an upper swage member comprising an inner and an outer ring body forming an annular molding cavity between them, a lower swage member comprising an inner and an outer ring body forming an annular molding cavity between them, annular recesses in adjacent edges of said ring bodies so as to form shoulders adapted to grip an annular disc of sheet-metal, means for clamping together said inner ring bodies and said outer ring bodies, a movable upper pressing member in the form of a hollow cylinder, a stationary lower pressing member in the form of a hollow cylinder, connecting means for rigidly connecting the bottom ends of the ring bodies of said lower swage members to each other, axially extending recesses adapted to receive said connecting means, means for imparting to said upper pressing member an operative motion relatively to said lower pressing member and resilient supporting means for said lower swage member.

14. In an apparatus of the character described, an upper swage member comprising an inner and an outer ring body forming an annular molding cavity between them, a lower swage member comprising an inner and an outer ring body forming an annular molding cavity between them, annular recesses in adjacent edges of said ring bodies so as to form shoulders adapted to grip an annular disc of sheet-metal, means for clamping together said inner ring bodies and said outer ring bodies, a movable upper pressing member in the form of a hollow cylinder, a stationary lower pressing member in the form of a hollow cylinder, connecting means for rigidly connecting the bottom ends of the ring bodies of said lower swage member to each other, axially extending recesses adapted to receive said connecting means, means for imparting to said upper pressing member an operative motion relatively to said lower pressing member, resilient supporting means for said lower swage member, and lever means allowing to arbitrarily lower said lower swage member against the action of said resilient means.

15. In an apparatus for applying frictional material to perforated discs of sheet-metal, a movable swage consisting of two parts adapted to securely grip between them a perforated disc of sheet-metal, a pressure space for the reception of the frictional material provided in each of said swage-parts, oppositely to said disc, and a pressure member within each of said pressure-spaces, one of said pressure-members being stationary and the other movable relatively to said stationary member and to said swage, said movable pressure-member applying through the intermediary of the frictional material in its pressure-space motion to the swage thereby compressing the frictional material in the two pressure-spaces.

16. In an apparatus for applying frictional material to perforated discs of sheet-metal, a movable swage consisting of two parts adapted to securely grip betwen them a perforated disc of sheet-metal, a pressure space for the reception of the frictional material provided in each of said swage-parts oppositely to said disc, a pressure-member within each of said pressure-spaces, one of said pressure-members being stationary and the other movable relatively to said stationary pressure-member and to said swage, and means for adjusting before the beginning of the pressing operation the volume of the pressure-space engaged by the stationary pressure-member in correspondence with the quantity of frictional material filled into said pressure-space.

17. In an apparatus for applying frictional material to perforated discs of sheet-metal, a movable swage consisting of two parts adapted to securely grip between them a perforated disc of sheet-metal, a pressure space for the reception of the frictional material provided in each of said swage-parts oppositely to said disc, a pressure-member within each of said pressure-spaces, one of said pressure-members being stationary and the other movable relatively to said stationary pressure-member and to said swage, and a hand-lever engaging said swage and serving for the adjustment of the volume of the pressure-space engaged by the stationary pressure-member, such hand-lever being yieldingly suspended and correspondingly taken along by the movable swage during the pressing operation.

18. In an apparatus for applying frictional material to perforated discs of sheet-metal, a movable swage consisting of two parts adapted to securely grip between them a perforated disc of sheet-metal, a pressure space for the reception of the frictional material provided in each of said swage-parts oppositely to said disc, a pressure-member within each of said pressure-spaces, one of said pressure-members being stationary and the other movable relatively to said stationary pressure-member and to said swage, and means for the removal of the swage-part engaged by the stationary pressure-member from the completed laminated disc supported by said stationary pressure-member, this removal being executed after the taking off of the movable pressure-member and the swage-part engaged by said member.

In testimony whereof I affix my signature.

HANS KATTWINKEL.